(12) United States Patent
Miyoshi (10) Patent No.: US 8,096,911 B2
(45) Date of Patent: Jan. 17, 2012

(54) ECCENTRIC OSCILLATING GEAR MECHANISM AND INDUSTRIAL ROBOT JOINT CONSTRUCTION USING THE SAME

(75) Inventor: Hiroyuki Miyoshi, Tsu (JP)

(73) Assignee: Nabtesco Corporation, Tokyo (JP)

( * ) Notice: Subject to any disclaimer, the term of this patent is extended or adjusted under 35 U.S.C. 154(b) by 592 days.

(21) Appl. No.: 12/265,243

(22) Filed: Nov. 5, 2008

(65) Prior Publication Data

US 2009/0124446 A1 May 14, 2009

(30) Foreign Application Priority Data

Nov. 9, 2007 (JP) ................ P2007-291462

(51) Int. Cl.
*F16H 1/32* (2006.01)
(52) U.S. Cl. .................................................. 475/178
(58) Field of Classification Search .......... 475/162, 475/163, 168, 176, 177, 178, 179
See application file for complete search history.

(56) References Cited

U.S. PATENT DOCUMENTS

| | | | |
|---|---|---|---|
| 6,517,460 B2 * | 2/2003 | Takeuchi et al. | 475/162 |
| 7,935,017 B2 * | 5/2011 | Kurita et al. | 475/162 |
| 2001/0044356 A1 | 11/2001 | Takeuchi et al. | |
| 2002/0155915 A1 * | 10/2002 | Tanaka | 475/162 |
| 2004/0192486 A1 * | 9/2004 | Tsurumi et al. | 475/168 |
| 2007/0232433 A1 * | 10/2007 | Haga et al. | 475/178 |
| 2008/0045369 A1 * | 2/2008 | Tamenaga | 475/160 |
| 2009/0325753 A1 * | 12/2009 | Hirata | 475/162 |
| 2010/0179013 A1 * | 7/2010 | Nakamura | 475/179 |

FOREIGN PATENT DOCUMENTS

| | | |
|---|---|---|
| JP | 09-057678 A | 3/1997 |
| JP | 2001-323972 A | 11/2001 |

OTHER PUBLICATIONS

Office Action issued Sep. 26, 2011 in CN Application No. 200810174568.X.

\* cited by examiner

*Primary Examiner* — Roger Pang
(74) *Attorney, Agent, or Firm* — Panitch Schwarze Belisario & Nadel LLP (57) ABSTRACT

There is provided an eccentric oscillating gear mechanism including an internal gear, an external gear meshing with the internal gear, a crankshaft for moving the external gear eccentrically, and a carrier for supporting rotatably the crankshaft, the internal gear and the carrier being made to rotate relatively, wherein a cylindrical tube body, which penetrates the eccentric oscillating gear mechanism in an axial direction, is supported rotatably on the carrier.

3 Claims, 6 Drawing Sheets

Prior Art

FIG. 7

Prior Art

ECCENTRIC OSCILLATING GEAR MECHANISM AND INDUSTRIAL ROBOT JOINT CONSTRUCTION USING THE SAME

BACKGROUND OF THE INVENTION

1. Field of the Invention

The present invention relates to an eccentric oscillating gear mechanism for use in a joint portion of an industrial robot.

2. Related Art

There have conventionally been known eccentric oscillating gear mechanisms such as those used in joint portions of industrial robots (hereinafter, also referred to simply as a "robot" from time to time) which are described in JP-A-9-57678 and JP-A-2001-323972 below.

Eccentric oscillating gear mechanisms described in JP-A-9-57678 and JP-A-2001-323972 are an eccentric oscillating gear mechanism which includes an internal gear, an external gear which meshes with the internal gear, a crankshaft which moves the external gear eccentrically, and a carrier which supports the crankshaft rotatably. The internal gear and the carrier are made to rotate relatively. The eccentric oscillating gear mechanism includes a hollow hole which is made axially about an axis thereof, and a cylindrical tube body is made to penetrate the hollow hole. Then, wiring, tubing and cables are passed through a hollow hole made in the cylindrical tube body, whereby the cables and others are prevented from being damaged by interior parts of the eccentric oscillating gear mechanism or lubricant inside is prevented from leaking out.

Figure 6:
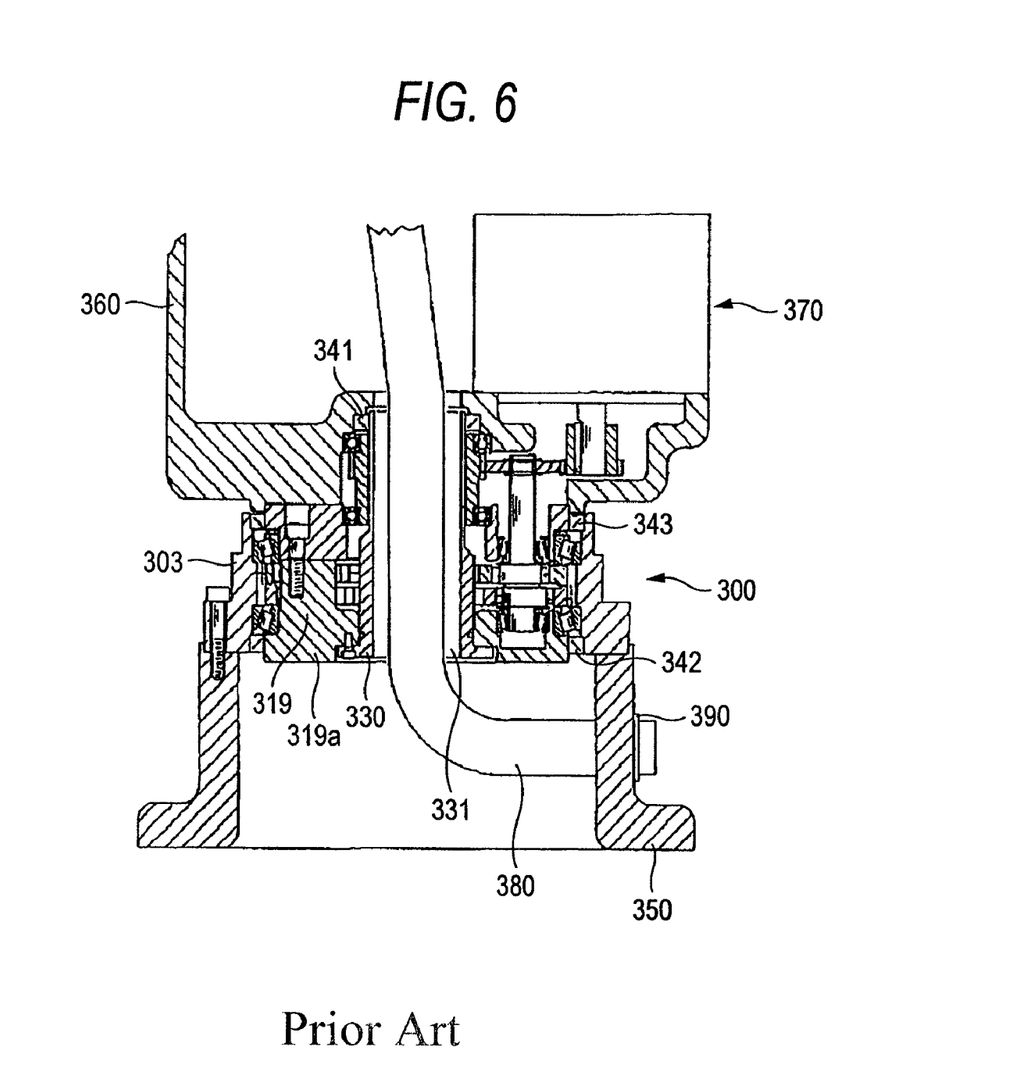
FIG. 6 is a sectional view of a turning part of an industrial robot where a conventional eccentric oscillating gear mechanism is used.
Figure 7:
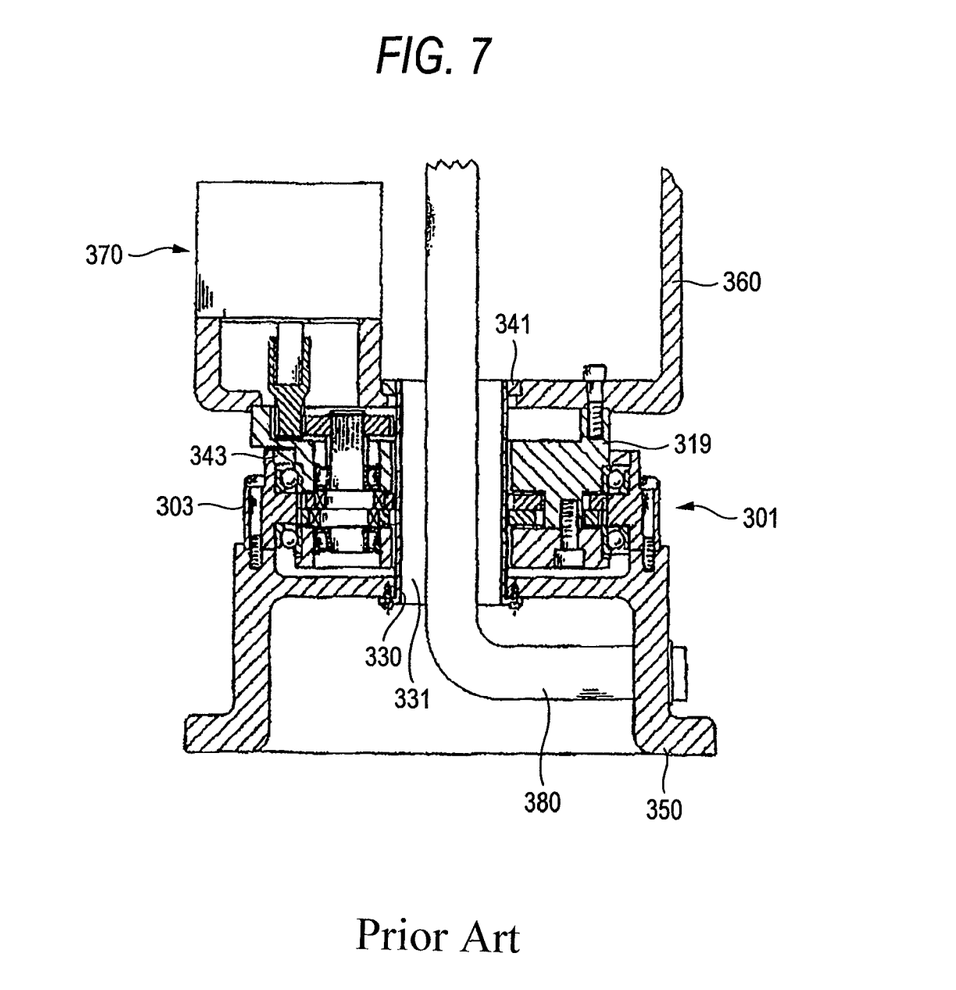
FIG. 7 is a sectional view of a turning part of an industrial robot where another conventional eccentric oscillating gear mechanism is used.

A joint portion of the industrial robot described in JP-A-9-57678 is shown in FIG. 6. A joint portion of the industrial robot described in JP-A-2001-323972 is shown in FIG. 7. Note that like reference numerals are imparted to like or similar parts for description.

In JP-A-9-57678, a cylindrical tube body 330 is inserted into an eccentric oscillating gear mechanism 300 from an end plate portion 319a side thereof (from a lower side as viewed in FIG. 6), and a flange portion which is provided at one end portion of the cylindrical tube body 330 is fixed to the end plate portion 319a with bolts. The other end portion of the cylindrical tube body 330 is inserted into a turning part 360 of the robot, and an oil seal 341 is inserted between the turning part and the other end portion of the cylindrical tube body. This oil seal is intended to prevent the ingress of a lubricant residing within the eccentric oscillating gear mechanism into a hollow hole 331. In addition, oil seals 342, 343 are also inserted between an internal gear 303 and a carrier 319 in such a manner as to prevent the leakage of the lubricant to an outside of the gear mechanism.

In JP-A-2001-323972, a cylindrical tube body 330 is inserted from a fixing portion 350 side of the robot (from a lower side as viewed in FIG. 7), and a flange portion provided at one end portion of the cylindrical tube body 330 is fixed to the fixing portion with bolts. The other end portion of the cylindrical tube body is inserted into a turning part 360 of the robot, and an oil seal 341 is inserted between the turning part and the other end of the cylindrical tube body. This oil seal is intended to prevent the ingress of a lubricant residing within the eccentric oscillating gear mechanism into a hollow hole 331. In addition, an oil seal 343 is also inserted between an internal gear 303 and a carrier 319 in such a manner as to prevent the leakage of the lubricant to an outside of the gear mechanism.

In the eccentric oscillating gear mechanisms 300, 301 in JP-A-9-57678 and JP-A-2001-323972, respectively, the internal gear 303 is fixed to the fixing portion of the robot, and the carrier 319 is fixed to the turning part 360 of the robot. Output rotation of a motor 370 is reduced in speed by the eccentric oscillating gear mechanism and is then outputted to the carrier 319 as a reduced-speed rotation, whereby the turning part 360 of the robot rotates at low speeds.

In JP-A-9-57678, since the cylindrical tube body 330 is fixed to the end plate portion 319a, that is, the carrier 319, the cylindrical tube body 330 rotates together with the carrier 319. Although the cylindrical tube body 330 rotates at low speeds as has been described above, since cables and other members 380 are held to the fixing portion 350 by means of a fastening device 390, the cables and other members 380 are caused to rub against the rotating cylindrical tube body 330. Due to the rubbing contact of the cylindrical tube body 330 with the cables and other members 380 for a long period of time, there is caused a problem that the cables and other members are damaged.

On the other hand, in JP-A-2001-323972, since the cylindrical tube body 330 is fixed to the fixing portion 350 of the robot, the cylindrical tube body 330 does not rotate at all. Since the cylindrical tube body 330 does not rotate, there occurs no such situation that the cylindrical tube body 330 rubs against cables and other members which pass therethrough. However, to place the cylindrical tube body 330 into the fixing portion 350 of the robot in the way described above, the robot has to be lifted to be suspended by a crane or the like so that the cylindrical tube body is inserted into the fixing portion from therebelow and is then fixed thereto with bolts or the like, resulting in deteriorated working efficiency and safety. In addition, since the cylindrical tube body is mounted on the robot side, normally a robot manufacturer needs to prepare cylindrical tube bodies at their own load.

SUMMARY OF THE INVENTION

The invention has been made in view of the problems, and an object thereof is to provide an eccentric oscillating gear mechanism which can support rotatably a cylindrical tube body so as to eliminate a possibility of cables and other members which pass through an interior of the cylindrical tube body being damaged and obviate the necessity of the cylindrical tube body being built in an industrial robot.

With a view to attaining the object, according to a first aspect of the invention, there is provided an eccentric oscillating gear mechanism including an internal gear, an external gear meshing with the internal gear, a crankshaft for moving the external gear eccentrically, and a carrier for supporting the crankshaft rotatably, the internal gear and the carrier being made to rotate relatively, wherein a cylindrical tube body, which penetrates the eccentric oscillating gear mechanism in an axial direction, is supported rotatably on the carrier.

In addition, according to a second aspect of the invention, there is provided an eccentric oscillating gear mechanism as set forth in the first aspect of the invention, wherein an outer circumferential portion of at least one end portion of the cylindrical tube body constitutes an engagement portion with a seal member.

Furthermore, according to a third aspect of the invention, there is provided an industrial robot joint construction having an eccentric oscillating gear mechanism as set forth in the first or second aspect of the invention, wherein the internal gear is fixed to a fixing portion of an industrial robot, and the end portion of the cylindrical tube body is inserted into a central hole provided in the fixing portion via a seal member.

According to the first aspect of the invention, since the cylindrical tube body is supported rotatably on the carrier, when cables and other members rotate irrespective of relative rotation between the internal gear and the carrier, the cylindrical tube body can rotate while following the cables and other members, and therefore, there occurs no such situation that the cables and other members are rubbed to be damaged by the cylindrical tube body. In addition, when the cables and other members are fixed to the fixing portion so as to be immobilized, in the event that the cylindrical tube body is fixed to the fixing portion, there occurs no such situation that the cables and other members are rubbed to be damaged by the cylindrical tube body. In addition, by the cylindrical tube body being supported rotatably on the carrier, the eccentric oscillating gear mechanism is allowed to incorporate the cylindrical tube body therein, this obviating the necessity of preparation of cylindrical tube bodies and mounting work of mounting cylindrical tube bodies in industrial robots in advance by a manufacturer.

In addition, according to the second aspect of the invention, since the outer circumferential portion of at least one end portion of the cylindrical tube body constitutes the engagement portion with the seal member, a sealed construction can easily be constructed via the mating member like a fixing portion of a robot and the seal member.

Furthermore, according to the third aspect of the invention, since the internal gear is fixed to the fixing portion of the industrial robot, and the end portion of the cylindrical tube body is inserted into the central hole provided in the fixing portion via the seal member, the assembling work of the joint construction of the industrial robot can be facilitated.

DETAILED DESCRIPTION OF THE PREFERRED EMBODIMENTS

Embodiment

Hereinafter, an embodiment of the invention will be described based on drawings.

Figure 1:
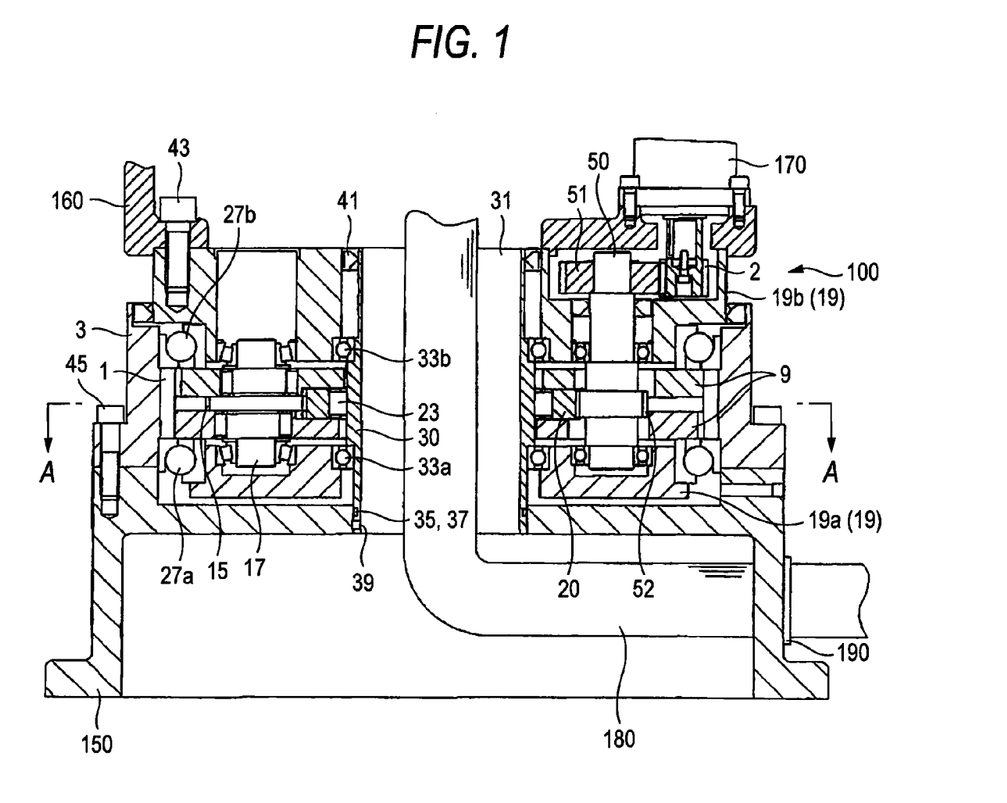
FIG. 1 is a sectional view of an eccentric oscillating gear mechanism of the invention which is attached to a turning part of an industrial robot.
Figure 2:
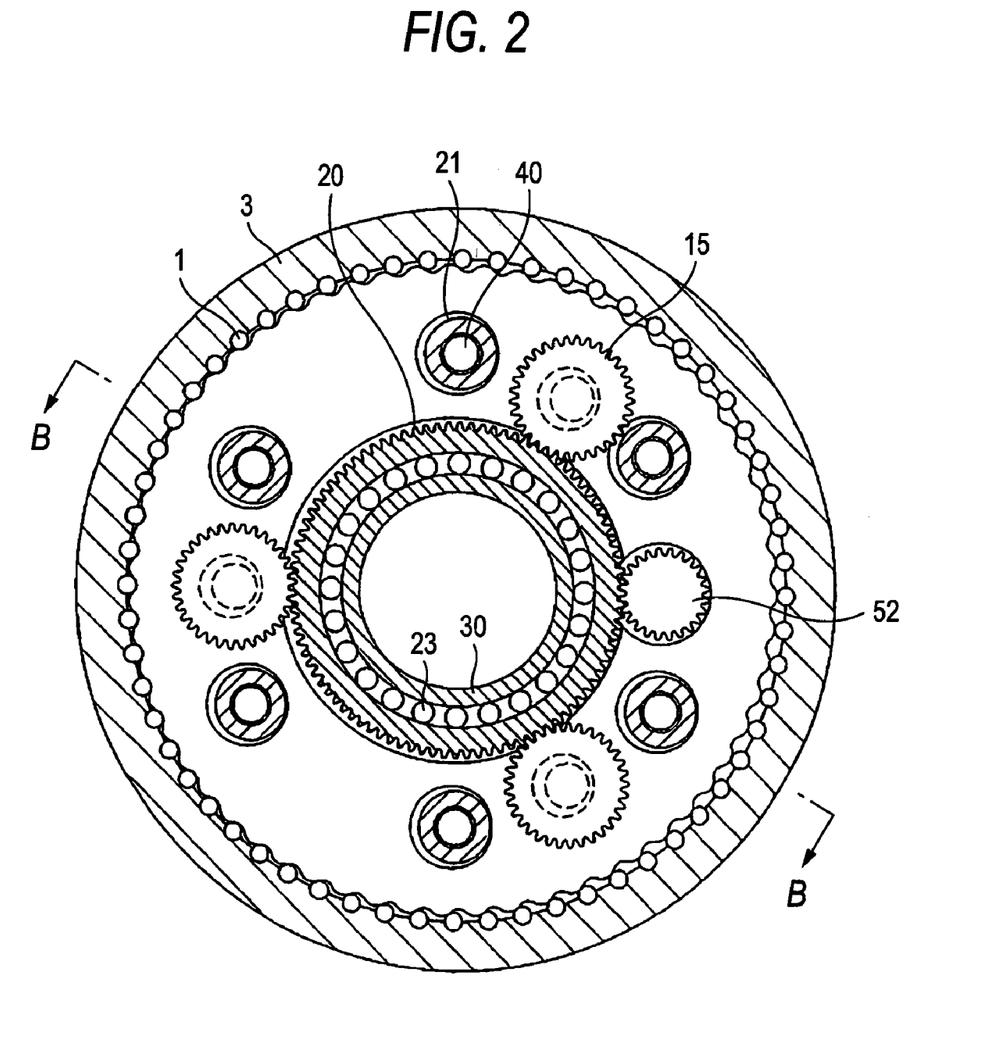
FIG. 2 is a sectional view taken along the line A-A in FIG. 1.
Figure 3:
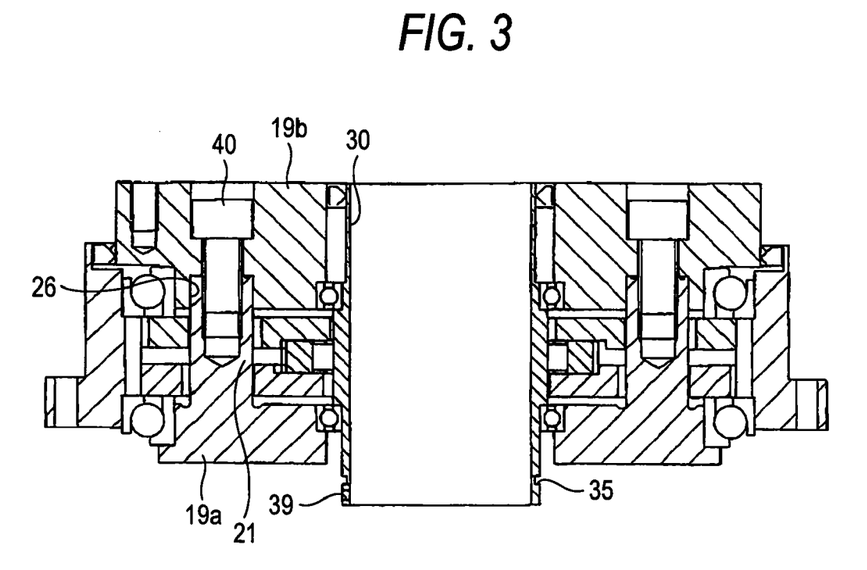
FIG. 3 is a sectional view taken along the line B-B in FIG. 2.

FIG. 1 is a drawing showing an example in which an eccentric oscillating gear mechanism of the invention is used in a turning part of an industrial robot, and FIG. 2 is a sectional view taken along the line A-A of the eccentric oscillating gear mechanism shown in FIG. 1. FIG. 3 is a sectional view taken along the line B-B in FIG. 2.

An eccentric oscillating gear mechanism 100 is made up of an internal gear 3 having internal teeth made up of a large number of pins, two external gears 9 which mesh with the internal gear 3, three crankshafts 17 for moving the external gears 9 eccentrically, and a carrier 19 which is made up of a pair of end plate portions 19a, 19b and a plurality of pillar portions 21 which connect together the pair of endplate portions and which supports rotatably the crankshafts 17, and the internal gear 3 and the carrier 19 are made to rotate relatively by means of a pair of main bearings 27a, 27b.

The pillar portions 21 are formed integrally on the end plate portion 19a in such a manner as to project therefrom and have a circular cross section. A corresponding number of circular holes 26 to the pillar portions 21 are formed in the other end plate portion 19b, whereby distal ends of the pillar portions 21 are inserted in and passed through the circular holes 26, respectively, so as to be fastened by bolts 40. By this configuration, the end plate portion 19a and the other end plate portion 19b, and the pillar portions 21 are fixed together, so as to constitute the carrier 19.

In the eccentric oscillating gear mechanism 100 of this embodiment, the internal gear 3 is fixed to a fixing portion 150 of a robot with bolts 45, and the carrier 19 is fixed to a turning part 160 of the robot with bolts 43. A motor 170 is fixed to the tuning part 160.

When rotation from the motor 170 is transmitted to an output gear 2, a ring gear 20 is rotated via spur gears 51, 52 of an intermediate shaft 50. When rotation of the ring gear 20 is transmitted to transfer gears 15 of the crankshafts 17, the crankshafts 17 move the external gears 9 in such a manner as to oscillate eccentrically relative to the carrier 19. Since the external gears 9 mesh with the internal gear 3 and the internal gear 3 is fixed, the carrier 19 rotates at reduced speeds to output rotation, so as to rotate the turning part 160 which is fixed to the carrier 19.

One cylindrical tube body 30 penetrates the carrier 19 and the external gears 9 to thereby be supported rotatably on the carrier 19. In this embodiment, the cylindrical tube body 30 is rotatably supported by the carrier 19 through two bearings. Namely, a bearing 33a is disposed between the cylindrical tube body 30 and the end plate portion 19a, while a bearing 33b is disposed between the cylindrical tube body 30 and the other end plate portion 19b.

Note that the bearings 33a, 33b can be omitted. In this embodiment, a cylindrical roller bearing 23 is configured which rolls on an inner circumferential surface of the ring gear 20 and an outer circumferential surface of a central portion of the cylindrical tube body 30 as bearing rolling surfaces. The ring gear 20 meshes with the transfer gears 15 of the three crankshafts 17 which are supported rotatably on the carrier 19. Namely, the cylindrical tube body 30 is supported rotatably on the carrier 19 via the ring gear 20.

In this embodiment, an engagement portion (in this embodiment, an O ring groove 35) with a seal member is provided on an outer circumferential portion of an end portion of the cylindrical tube body 30, and the end portion of the cylindrical tube body 30 is inserted into a central hole provided in a central portion of the fixing portion 150 via an O ring 37 as a seal member. The O ring 37 prevents the leakage of a lubricant in an interior of the eccentric oscillating gear mechanism from a minute gap between the cylindrical tube body 30 and the fixing portion 150. It is noted that a spigot connection can be realized by setting small a gap dimension between the outer circumferential portion of the end portion of the cylindrical tube body 30 and the central hole in the fixing portion.

Here, although the carrier 19 rotates relative to the fixing portion 150, since the cylindrical tube body 30 is supported rotatably on the carrier 19, the cylindrical tube body 30 does not rotate. In addition, in this embodiment, since the O ring (a fixed seal) is used as the seal member, the cylindrical tube body 30 is fixed in the central hole in the fixing portion 150.

In this way, since the cylindrical tube body 30 does not rotate and cables and other members 180 are fixed to the fixing portion 150 by a fastening device 190, there occurs no such situation that the cables and other members 180 which pass through an interior 31 of the cylindrical tube body 30 are rubbed to be damaged.

Furthermore, a screw hole 39 for a set screw for fixing the cylindrical tube body is provided at the end portion of the cylindrical tube body 30, whereby the cylindrical tube body. 30 can be fixed to the fixing portion 150 of the robot as required in an ensured fashion and is then prevented from rotating. Therefore, the cylindrical tube body 30 is prevented from rubbing against the cables and other members. In addition, the fact that the cylindrical tube body 30 is prevented from rotating is also advantageous in prevention of the leakage of lubricant by the O ring. In addition, the screwing attachment of the set crew can easily be implemented by inserting a tool into the interior of the cylindrical tube body 30.

In this embodiment, the cylindrical tube body 30 is rotatably supported on the carrier 19, that is, the cylindrical tube body 30 is incorporated in the eccentric oscillating gear mechanism 100. This obviates the necessity of work of installing the cylindrical tube body 30 into the eccentric oscillating gear mechanism after the gear mechanism has been attached to the robot or of preparation of cylindrical tube bodies 30 by a robot manufacturer.

Note that while in the embodiment, the O ring groove is provided on the cylindrical tube body, the O ring groove may be provided on the fixing portion of the robot. As this occurs, the engagement portion constitutes an abutment surface with the O ring.

In addition, while the O ring is used as the fixed seal for the seal member between the cylindrical tube body 30 and the fixing portion 50 of the robot, in addition thereto, a fixed seal such as a liquid sealing material or a rotary seal such as an oil seal can be used.

Figure 4:
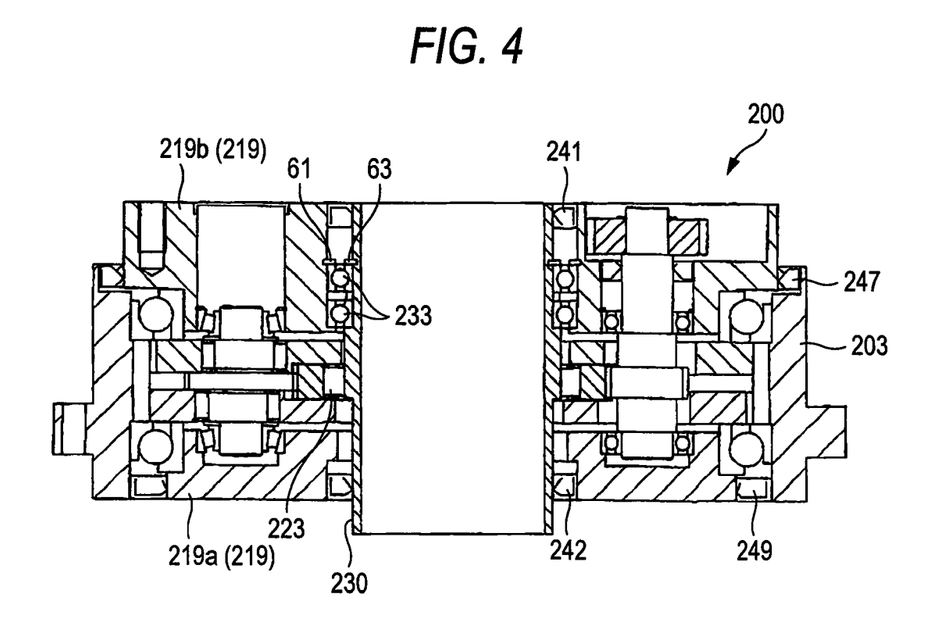
FIG. 4 is a sectional view of another form of an eccentric oscillating gear mechanism of the invention.

FIG. 4 shows another embodiment of a supporting construction in which a cylindrical tube body is supported rotatably on a carrier. In this embodiment, a cylindrical tube body 230 is inserted into an eccentric oscillating gear mechanism 200 to be fixed in place therein after the same gear mechanism has been assembled. Bearings 233 (two bearings in this embodiment) are fixed to the cylindrical tube body 230 by a retainer ring 63 in advance, and the cylindrical tube body 230 is inserted from the other end plate portion 219b side (from an upper side as viewed in the figure) of the gear mechanism to thereby be fixed to the other end plate portion 219b by a retainer ring 61.

Since the cylindrical tube body 230 is assembled from the rear, there occurs no such situation that the cylindrical tube body disturbs the assemblage of the eccentric oscillating gear mechanism 200.

In addition, in this embodiment, an oil seal 242 is inserted between an outer circumferential portion of one end portion of the cylindrical tube body 230 and one end plate portion 219a, while an oil seal 241 is inserted between an outer circumferential portion of the other end portion of the cylindrical tube body 230 and the other end plate portion 219b. In addition to this, oil seals 247, 249 are also inserted between inner circumferential portions of both end portions of an internal gear 203 and the carrier 219. Because of this, the eccentric oscillating gear mechanism 200 is constructed in such a manner that a lubricant is sealed in an interior of the same gear mechanism.

Figure 5:
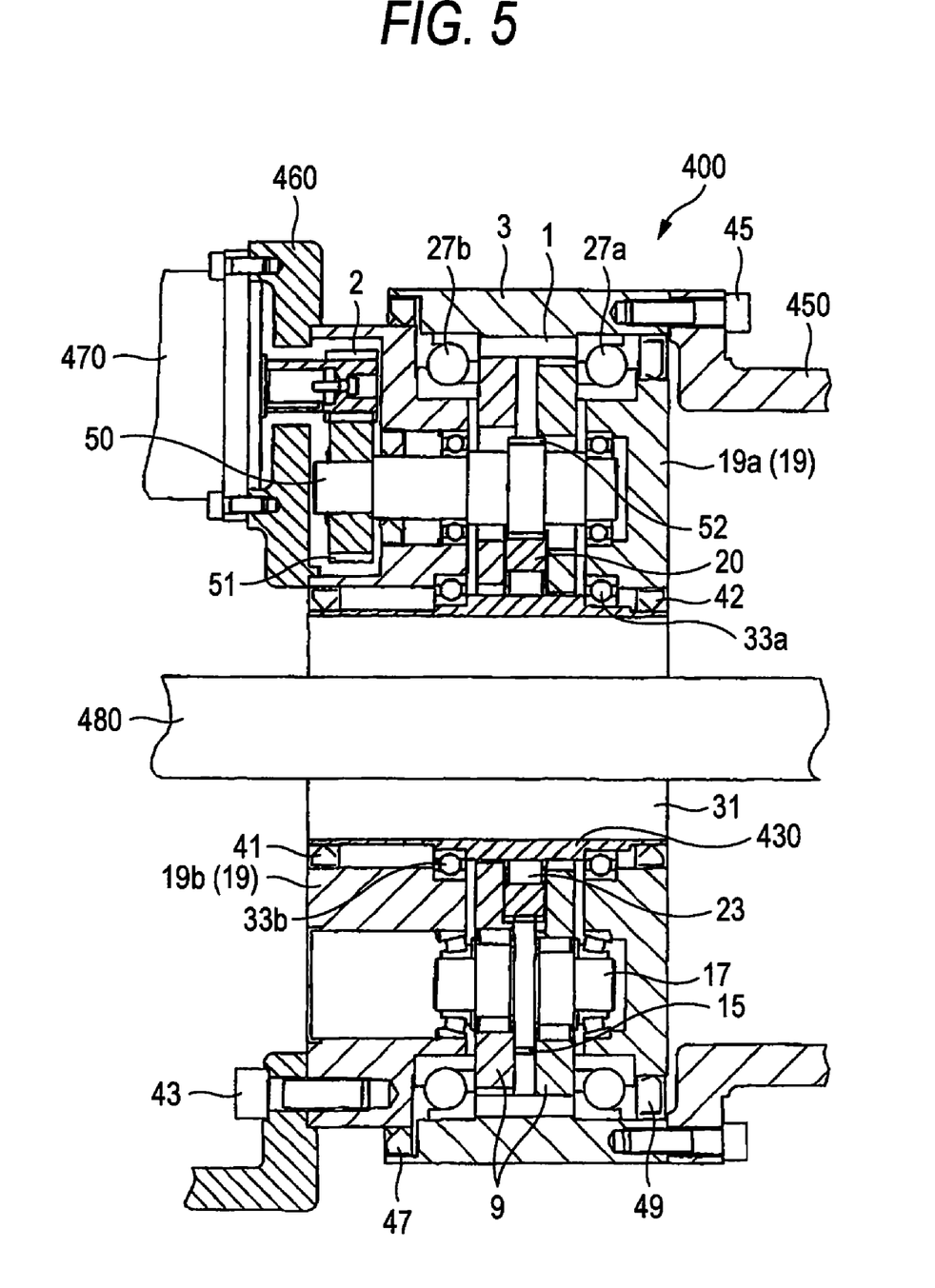
FIG. 5 is a sectional view of an eccentric oscillating gear mechanism of the invention which is attached to a wrist part of the industrial robot.

FIG. 5 shows a further embodiment of the invention in which an eccentric oscillating gear mechanism of the invention is used in a different joint such as a wrist part of an industrial robot. To describe the embodiment, in the figure, like reference numerals are imparted to constituent portions identical or like to those depicted in FIG. 1.

An eccentric oscillating gear mechanism 400 of the invention is such that a carrier 19 is fixed to a proximal end side arm 460 of the robot, and an internal gear 3 is fixed to a distal end side arm 450 of the robot. A motor 470 is fixed to the proximal end side arm 460. When rotation of the motor is transmitted to an output gear 2, since the output gear 2 meshes with a spur gear 51 of an intermediate shaft 50 which is supported rotatably on the carrier 19, the rotation is transmitted to a crankshaft 17.

As with the embodiment depicted in FIG. 1, a cylindrical tube body 430 is supported rotatably on the carrier 19. On the other hand, oil seals 41, 42, which are rotary seals, are inserted between outer circumferential portions of both end portions of the cylindrical tube body 430 and the carrier 19. Because of this, the cylindrical tube body 430 can rotate independently of relative rotation between the internal gear 3 and the carrier 19.

In addition, in this embodiment, a pair of oil seals 47, 49 are also provided between the carrier 19 and the internal gear 3, so as to seal a lubricant in an interior of the eccentric oscillating gear mechanism together with the pair of oil seals described above.

In this embodiment, the distal end side arm 450 rotates as the internal gear 3 rotates. When cables and other members 480 are fixed to the distal end side arm, the cables and other members 480 also rotates together with the arm.

In this way, when the cables and other members rotate, although there is a possibility that the cylindrical tube body 430 rubs against the cables and other members 480, since the cylindrical tube body 430 itself is supported rotatably on the carrier 19 irrespective of relative rotation between the internal gear 3 and the carrier 19, the cylindrical tube body 430 is made to follow the rotation of the cables and other members 480, whereby there occurs no such situation that the cables and other members 480 themselves are damaged.

According to the invention, by providing the eccentric oscillating gear mechanism which incorporates the cylindrical tube body which is supported rotatably on the carrier, as has been described in the above embodiments, the cylindrical tube body can be used in the turning part or the wrist part of the industrial robot while allowed to rotate or being fixed.

Thus, while the invention has been described based on the embodiments, the invention is not limited to those embodiments but can be modified variously without departing from the spirit and scope thereof. For example, one or three or more external gears may be used. The number of crankshafts used is not limited to three and hence, two or three or more crankshafts may be used. Alternatively, only one crankshaft may be used at a rotational center. In addition, the invention can also be applied to an eccentric oscillating gear mechanism which includes a hollow hole provided axially about an axis thereof.

The invention can be applied to eccentric oscillating gear mechanisms which are used in every industrial field.

In particular, the invention has an optimum application to eccentric oscillating gear mechanisms which are used in joint parts of industrial robots, rotary table systems, automatic tool exchanging systems for machine tools and the like.

What is claimed is:

1. An eccentric oscillating gear mechanism comprising:
an internal gear,
an external gear meshing with the internal gear, a crankshaft for moving the external gear eccentrically, and a carrier for supporting the crankshaft rotatably, the internal gear and the carrier being made to rotate relatively, wherein a cylindrical tube body, which penetrates the eccentric oscillating gear mechanism in an axial direction, is supported rotatably on the carrier by bearings located immediately between the carrier and the cylindrical tube body.

2. An eccentric oscillating gear mechanism as set forth in claim 1, wherein an outer circumferential portion of at least one end portion of the cylindrical tube body constitutes an engagement portion with a seal member.

3. An industrial robot joint construction having an eccentric oscillating gear mechanism as set forth in claim 1, wherein the internal gear is fixed to a fixing portion of an industrial robot, and the end portion of the cylindrical tube body is inserted into a central hole provided in the fixing portion via a seal member.

* * * * *